(12) United States Patent
Kawamura

(10) Patent No.: US 8,367,876 B2
(45) Date of Patent: Feb. 5, 2013

(54) METHOD FOR PRODUCING POLYETHER

(75) Inventor: Takeshi Kawamura, Takasago (JP)

(73) Assignee: Kaneka Corporation, Osaka (JP)

( * ) Notice: Subject to any disclaimer, the term of this patent is extended or adjusted under 35 U.S.C. 154(b) by 675 days.

(21) Appl. No.: 11/631,028

(22) PCT Filed: Jul. 8, 2005

(86) PCT No.: PCT/JP2005/012637
§ 371 (c)(1),
(2), (4) Date: Dec. 28, 2006

(87) PCT Pub. No.: WO2006/006511
PCT Pub. Date: Jan. 19, 2006

(65) Prior Publication Data
US 2008/0033128 A1    Feb. 7, 2008

(30) Foreign Application Priority Data

Jul. 13, 2004  (JP) ................... 2004-206533

(51) Int. Cl.
*C07C 43/00*    (2006.01)
(52) U.S. Cl. ........ 568/624; 568/620; 568/699; 568/679; 568/623
(58) Field of Classification Search ............. 528/425
See application file for complete search history.

(56) References Cited

U.S. PATENT DOCUMENTS

| 3,356,738 | A |   | 12/1967 | Hauser el al. |
| 4,482,750 | A |   | 11/1984 | Hetzel et al. |
| 5,098,993 | A |   | 3/1992  | Kawanami et al. |
| 5,811,566 | A |   | 9/1998  | Watabe et al. |
| 5,973,096 | A | * | 10/1999 | Watabe et al. ................ 528/15 |

FOREIGN PATENT DOCUMENTS

| EP | 0038983 A2   | 11/1981 |
| EP | 0693513 A2   | 1/1996  |
| JP | 56-167727 A  | 12/1981 |
| JP | 01-29-4733 A | 11/1989 |
| JP | 08-109253 A  | 4/1996  |
| JP | 8-109253 A   | 4/1996  |
| JP | 8-231707 A   | 9/1996  |
| JP | 2002249580 A | 9/2002  |

* cited by examiner

*Primary Examiner* — Shane Fang
(74) *Attorney, Agent, or Firm* — Sughrue Mion, PLLC

(57) ABSTRACT

A method wherein the separability between a polyether phase and a water phase is improved when a water-soluble compound is extracted and removed from a polyether containing the water-soluble compound with water is provided. The method comprises producing a polyether including a step of extracting and removing a water-soluble compound from a polyether containing the water-soluble compound with water, wherein the step includes at least an operation of separating a water phase from a polyether phase at a temperature of 50° C.

10 Claims, No Drawings

_____

METHOD FOR PRODUCING POLYETHER

RELATED APPLICATION

This application is a nationalization of PCT application PCT/JP2005/012637 filed on Jul. 8, 2005, claiming priority based on Japanese Application No. 2004-206533 filed on Jul. 13, 2004, the contents of which are incorporated herein by reference in their entirety.

TECHNICAL FIELD

The present invention relates to a method for producing a polyether including a step of extracting and removing a water-soluble compound from a polyether containing the water-soluble compound (hereinafter referred to as "crude polyether") with water.

BACKGROUND ART

Various types of polymeric substances such as polyethers have been industrially produced. Usually, these polymeric substances are produced by purifying a polymeric substance containing impurities (crude polymeric substance) to remove the impurities.

Examples of the impurities contained in such a crude polymeric substance include metal compounds derived from an alkali metal compound and a double metal cyanide complex, and specific examples thereof include the following compounds:

(1) In producing a hydroxyl-group-containing polyether by allowing an alkylene oxide to react with an initiator, a double metal cyanide complex catalyst is used as a catalyst. This catalyst remains in the resulting polymeric substance without change or as a modified decomposition product.

(2) When an oxyalkylene polymer such as polypropylene oxide is produced by addition polymerization of an alkylene oxide, an alkali metal compound such as sodium hydroxide or potassium hydroxide is used as a catalyst. This alkali metal compound remains in the resulting polymeric substance without change or as a salt.

(3) When a functional-group-containing polymer such as an oxyalkylene polymer or a diene polymer that has a hydroxyl group or a carboxyl group is allowed to react with a halogen-containing compound such as epichlorohydrin or allyl chloride to produce a polymer having another functional group, an alkali metal compound such as sodium hydroxide or potassium hydroxide is used as a catalyst. This alkali metal compound remains in the resulting polymeric substance without change or as a salt.

In addition to the above cases, there are many crude polymeric substances contaminated with a metal compound such as an alkaline earth metal compound or a transition metal compound.

Since such a metal compound remaining in a polymeric substance causes various problems, the metal compound is preferably minimized. For example, when the polymeric substance is used in further reaction, the metal compound may affect the reaction rate or the reaction yield. Therefore, the metal compound must be sufficiently removed. More specifically, when methyldimethoxysilane or the like is allowed to react with an allyl-group-terminated polyether in the presence of a platinum-containing catalyst, a metal compound remaining due to insufficient removal significantly decreases the reaction rate.

In general, impurities are often removed by, for example, a treatment with an adsorbent or a method including neutralization, filtration, and subsequent extraction with water.

Among these, the treatment with an adsorbent is disadvantageous in that the treatment is not suitable for treating a large amount of metal compound and that the type of usable adsorbent is limited when the metal compound is a salt.

The method including filtration is disadvantageous in that crystals of neutralized salts must be enlarged and that the salts are dissolved in water when water is present.

Because of these problems and other reasons, a method of extraction separation is suitable for many cases.

The method of extraction separation is a method of sufficiently bringing a crude polymeric substance into contact with water to transfer a metal compound in the form of a water-soluble salt to the water, and then separating the water from the polymeric substance. Hitherto, it has been believed that when vigorous agitation is performed in order to satisfactorily bring a crude polymeric substance into contact with water, the system easily becomes an emulsion state because of the presence of the polymeric substance (Patent Documents 1 and 2). In particular, Patent Document 2 describes as follows: "Since polyethers produced in the presence of a double-metal cyanide complex catalyst are emulsified with water very easily, it is extremely difficult to remove the catalyst by an extraction method". Accordingly, it may take a long time for the subsequent separation of water from the polymeric substance or a huge apparatus may be required. On the other hand, when the agitation is moderately performed to prevent emulsification, the metal compound is not satisfactorily extracted. Consequently, it is necessary to establish a technique that satisfies incompatible conditions, namely, a technique in which the extraction efficiency is increased and the separability is also increased. Furthermore, such an extraction method using water cannot be used for polymeric substances having high hydrophilicity. Even in hydrophobic polymeric substances, when a trace of hydrophilic impurities is contained in starting materials, emulsification occurs extremely easily. Accordingly, the application of such an extraction method is significantly limited for industrial use. It is desirable to establish a production method including a versatile purification method that can be used for not only unsaturated-group-containing polyethers but also high-molecular-weight polyethers having the above properties.

An example of a disclosed method is a method including centrifugal separation to actively promote oil-water separation (Patent Document 3). As an apparatus used for a general method of extraction separation, a spray tower; a continuous countercurrent extraction tower, such as a stirring-type tower, and a reciprocating-type tower; and a centrifugal separator are used and disclosed (Patent Documents 1 and 3). These unexamined patent applications provide a method in which a polyether, which is a polymer, and water are agitated in a high-speed-agitation-type agitation tank equipped with impellers, and the water phase is then separated from the polyether phase in a centrifugal separator or a countercurrent contact-type agitation tower or using a filter. However, in these methods, in order to increase the extraction efficiency, an agitation tank for high-speed agitation and an expensive centrifugal separator or a filter must be used. It is believed that this is a problem to be solved.

Furthermore, when a polyalkylene oxide is produced by ring-opening polymerization of an alkylene oxide having three or more carbon atoms, such as propylene oxide, and an initiator contains a polymer of ethylene oxide or the monomer contains ethylene oxide as an impurity, these components increase the hydrophilicity of the resulting polymer, and thus it may be significantly difficult to perform extraction separation with water. In order to prevent this problem, it is necessary to strictly control the content of the polymer of ethylene oxide in the initiator and the content of ethylene oxide in the monomer.

Patent Document 1: Japanese Unexamined Patent Application Publication No. 2002-249580
Patent Document 2: Japanese Unexamined Patent Application Publication No. 8-231707
Patent Document 3: Japanese Unexamined Patent Application Publication No. 1-294733

DISCLOSURE OF INVENTION

Problems to be Solved by the Invention

An object of the present invention is to provide a method for producing a purified polyether wherein the separability between a polyether phase and a water phase is improved when a water-soluble compound is extracted and removed from a polyether containing the water-soluble compound with water.

Means for Solving the Problems

To overcome the above-described problems, the present inventors have conducted intensive studies and completed the present invention.

Namely, the present invention relates to a method for producing a polyether including a step of extracting and removing a water-soluble compound from a polyether containing the water-soluble compound (crude polyether) with water, wherein the step includes at least an operation of separating a water phase at a temperature of 50° C. or higher.

The temperature at which the water phase is separated from the polyether phase is preferably in the range of 60° C. to 140° C.

The amount of water added in the step of extracting and removing a water-soluble compound from a crude polyether with water is preferably in the range of 20 to 100 parts by weight relative to 100 parts by weight of the crude polyether.

Furthermore, in the step of extracting and removing a water-soluble compound from a crude polyether with water, 1 to 50 parts by weight of an organic solvent may be added relative to 100 parts by weight of the crude polyether.

The operation of separating the water phase from the polyether phase after extraction is preferably performed by a method of settling separation or centrifugal separation.

In the step of extracting and removing a water-soluble compound from a crude polyether with water, the temperature at which a mixture of the crude polyether and water is extracted is preferably in the range of 60° C. to 140° C.

The present invention can be more preferably used when the crude polyether is either a hydroxyl-group-containing polyether prepared by allowing an alkylene oxide to react with an initiator in the presence of a metal-containing catalyst, or a modified product of the hydroxyl-group-containing polyether.

The present invention is effective when 90 weight percent or more of the alkylene oxide is an alkylene oxide having three or more carbon atoms. The present invention can be preferably used when the alkylene oxide is propylene oxide.

Examples of the modified product of the hydroxyl-group-containing polyether include unsaturated-group-containing polyethers, typically, polyethers whose main chain is prepared by allowing an alkylene oxide to react with an initiator in the presence of a double metal cyanide complex catalyst.

More specifically, examples of the modified product of the hydroxyl-group-containing polyether include unsaturated-group-containing polyethers obtained by allowing an alkylene oxide to react with an initiator in the presence of a double metal cyanide complex catalyst to prepare a hydroxyl-group-containing polyether, converting the hydroxyl-group-containing polyether to an alkali metal alkoxide, and then allowing the product to react with an unsaturated-group-containing halogenated hydrocarbon.

Furthermore, an example of the unsaturated group is an allyl group.

The water-soluble compound in the present invention is not particularly limited, but the present invention is preferably used for removing impurities, such as zinc salts and cobalt salts, which are derived from a catalyst used in polymerization of polyethers, and also alkali metal salts.

The present invention is particularly suitable for polyethers having a number-average molecular weight in the range of 1,000 to 100,000.

Advantages of the Invention

According to the present invention, a polyether containing an extremely small amount of an inorganic salt of a basic alkali metal compound and an acid or an extremely small amount of a water-soluble compound such as a metal salt derived from a double metal cyanide complex catalyst can be produced with a simple apparatus within a short time. When the polyether thus obtained is used as a starting material, a high-quality polyether can be stably produced.

Furthermore, according to the present invention, separation can be performed even when a polyether contains ethylene oxide units in an amount that is believed to be difficult to remove impurities by extraction separation with water by known methods.

BEST MODE FOR CARRYING OUT THE INVENTION

In the present invention, a crude polyether containing a water-soluble compound is not particularly limited, and any crude polyether can be used. The crude polyether, i.e., an oxyalkylene polymer containing a water-soluble compound, may be a homopolymer composed of a single repeating unit or a copolymer. Alternatively, the crude polyether may be a product prepared by a reaction of a polymer to convert it to another polymer.

The oxyalkylene polymer is a polymer primarily including a repeating unit represented by —R—O— (preferably in an amount of at least 50% (weight percent, hereinafter the same), and more preferably at least 80% of the total polymer). Examples of —R— include —$CH_2CH_2$—, —$CH(CH_3)CH_2$—, —$CH(C_2H_5)CH_2$—, —$C(CH_3)_2CH_2$—, and —$(CH_2)_4$—. In particular, the polyether preferably has a number-average molecular weight in the range of 1,000 to 100,000 in terms of polystyrene in gel permeation chromatography (GPC). When the number-average molecular weight is less than 1,000 or more than 100,000, a satisfactory separability between a polyether phase and a water phase is not obtained in some cases.

The oxyalkylene polymer may be a hydroxyl-group-terminated polymer. Alternatively, the oxyalkylene polymer may be an unsaturated-group-containing polyether prepared by allowing a hydroxyl-group-containing polyether to react with an alkali metal compound to convert the termini, followed by a reaction with an unsaturated-group-containing halogenated hydrocarbon.

Examples of the unsaturated-group-containing halogenated hydrocarbon include polyhalogenated unsaturated hydrocarbons having 4 or less of carbon atoms and monohalogenated unsaturated hydrocarbons having 10 or less of carbon atoms.

As regards the halogen, chlorine or bromine is preferred. In particular, an alkenyl chloride or an alkenyl bromide is preferred. As regards the halogenated alkenyl, allyl chloride, methallyl chloride, or allyl bromide is particularly preferred.

Examples of the water-soluble compound to be removed from a polyether include alkali metal compounds and compounds derived from a double metal cyanide complex catalyst, e.g., zinc salts, cobalt salts, and/or alkali metal salts.

The above alkali metal compounds mean alkali metal compounds that are used as, for example, a catalyst in polymerization or a substance for modification of a polyether and remain in the crude polyether without change or as other compounds.

Examples of the metal compounds such as alkali metal compounds include alkali metals such as Na and K; alkali metal hydrides such as NaH; alkali metal alkoxides such as $NaOCH_3$ and $NaOC_2H_5$; alkali hydroxides such as sodium hydroxide and potassium hydroxide; alkali metal-organic acid salts of an organic acid such as a carboxylic acid, e.g., HCOONa, $CH_3COONa$, $C_2H_5COONa$, HCOOK, $CH_3COOK$, and $C_2H_5COOK$; and alkali metal-inorganic salts of an acid such as a hydrogen halide or sulfuric acid, e.g., NaCl, $Na_2SO_4$, $Na_2CO_3$, $NaHCO_3$, $Na_3PO_4$, $Na_2HPO_3$, $NaNO_3$, KCl, $K_2SO_4$, $K_2CO_3$, $KHCO_3$, $K_3PO_4$, $K_2HPO_3$, and $KNO_3$.

Although Na, K, and the like are alkali metals, for the purpose of this description, these elements are considered to be a type of alkali metal compounds. In addition, NaH, $NaOCH_3$, and the like are not extracted in water in the form of these compounds but are extracted in water in the form of other alkali metal compounds.

When a crude polyether is prepared in the presence of a double metal cyanide complex catalyst, metal salts derived from this catalyst remain in the crude polyether. An example of the double metal cyanide complex catalyst is a complex compound containing zinc hexacyanocobaltate as a main component, and, for example, an ether complex compound thereof is well known. The composition described in, for example, U.S. Pat. No. 3,427,256 can be used. An example of the ether is ethylene glycol dimethyl ether (glyme).

Very surprisingly, according to the present invention, by agitating and mixing a crude polyether, which forms an oil phase, and added water, which forms a water phase, and then merely increasing the temperature to 50° C. or higher, a satisfactory oil-water separability between a polyether phase and a water phase can be achieved.

More specifically, when a mixture of a crude polyether and water is agitated for five minutes or more, preferably, ten minutes or more to extract a water-soluble compound and the mixing under agitation is then stopped, oil-water separation occurs. When the temperature during separation is 50° C. or higher, satisfactory oil-water separability can be obtained. For example, even by settling separation, the lower layer, i.e., water phase, can be satisfactorily separated. When a large amount of metal salts still remains in the oil phase after the separation of the water phase, this series of procedures including extraction and separation of the water phase is repeated, thereby achieving a high purification level in which the amount of residual metal salts is extremely small.

Regarding the time of mixing under agitation, in the case of a batch agitation tank, the time can be easily understood and need not be described. In the case of a continuous agitation tank, the time means the average residence time. In this case, the average residence time is defined as (volume of continuous apparatus)/(average process flow rate).

During the separation of the water phase from the polyether phase, the temperature is preferably high, namely 50° C. or higher, and more preferably 60° C. or higher in view of separability. However, when the temperature exceeds 140° C., the polymer may be degraded.

From a practical standpoint, the temperature during extraction prior to the separation is preferably matched with the temperature during the separation of the water phase from the polyether phase, and preferably in the range of 60° C. to 140° C. From the standpoint of increasing the extraction rate, a higher temperature is preferred.

In the step of extracting and removing the water-soluble compound from the crude polyether with water, the amount of water added is preferably in the range of 20 to 100 parts by weight relative to 100 parts by weight of the crude polyether.

Fundamentally, the addition of an organic solvent is not necessary in order to improve the oil-water separability. This means' that an organic solvent need not be distilled off in the subsequent step, which is one of the important features of this patent. However, when the polymer has a very high viscosity or when it is desired to decrease the content of water remaining in the oil phase after separation of the water phase, an organic solvent may be added. In order to achieve the above effect, the amount of organic solvent added is preferably at least 1 part by weight relative to 100 parts by weight of the crude polyether. However, in order to prevent an excessive increase in the vapor pressure at the extraction temperature, the amount added is preferably 50 parts or less. The addition of an excessive amount of organic solvent is not preferable from a practical standpoint because the price of an extraction apparatus is increased.

Although the addition of an organic solvent is not fundamentally necessary, when an organic solvent is added because of the above-described reason or the like, an organic solvent that dissolves the crude polyether and that is not substantially dissolved in water (i.e., that causes phase separation with water) is preferably used.

Examples of such an organic solvent include aliphatic, alicyclic, and aromatic hydrocarbon solvents, ether solvents, and halides thereof. Specific examples thereof include, but are not limited to, butanes, pentanes, hexanes, heptanes, octanes, nonanes, decanes, dodecanes, cyclohexane, cyclopentane, benzene, toluene, xylenes, butanol, pentanol, methyl ether, ethyl ether, isopropyl ether, methylene chloride, methyl chloroform, carbon tetrachloride, dichlorodifluoromethane, perchloroethylene, and benzene solvents and toluene solvents that are substituted with at least one chlorine atom, bromine atom and/or iodine atom. These may be used alone or in combinations of two or more. The most preferred example is n-hexane.

The ratio of water to the crude polyether need not be particularly limited. However, the amount of water used is preferably in the range of 20 to 100 parts by weight relative to 100 parts by weight of the crude polyether because of the following reasons. When the amount of water is small, it is necessary to increase the number of times of extraction and separation of the water phase in order to satisfy a required purification level. However, in the batch-type extraction, this method is preferred in view of the tank volume. When the amount of water used is smaller than 20 parts by weight, almost all the water is contained in the oil phase by dissolution or fine dispersion, and separation tends not to occur. In contrast, when the amount of water is large, the above-described number of times of extraction and separation of the water phase can be decreased. However, this method is industrially suitable for a continuous process rather than a batch process because a large container is required for the batch process. The type of process can be selected in accordance with practical other limitations.

The method of oil-water separation can be selected from general methods of oil-water separation, such as a method in which settling separation is performed in an agitation tank after agitation is stopped, a mixer/settler method in which a processed liquid obtained from an agitation tank is separated in a settler, and a method using a centrifugal separator.

A water phase that is dissolved or slightly dispersed in the purified polymer obtained by such a method of oil-water separation can be removed by volatilization under a reduced pressure with a vacuum pump or the like under heating at about 80° C. to 130° C. Accordingly, a highly purified polyether that can also be used for the subsequent reaction can be easily produced.

EXAMPLES

The present invention will now be described in detail on the basis of examples, but the present invention is not limited by these examples.

Production Example 1

Polymerization of propylene oxide was conducted with an initiator prepared by mixing equivalent weights of polypropylene glycol having a molecular weight of 2,000 and polypropylene triol having a molecular weight of 3,000 in the presence of a zinc hexacyanocobaltate complex catalyst to prepare a hydroxyl-group-terminated polyether oligomer. A methanol solution of sodium methoxide was then added to the hydroxyl-group-terminated polyether oligomer, and the methanol was distilled off. Furthermore, 3-chloro-1-propene was added to the mixture to convert the terminal hydroxyl groups into ally groups. Thus, a crude polyether A was prepared. The polyether A had a number-average molecular weight of 19,000 in terms of polystyrene in GPC.

Production Example 2

Polymerization of propylene oxide was conducted using polypropylene glycol (Actocol MF-78 manufactured by Mitsui-Takeda Chemicals, Inc.) having a molecular weight of 3,000 as an initiator in the presence of a zinc hexacyanocobaltate complex catalyst to prepare a hydroxyl-group-terminated polyether oligomer B. The polyether oligomer B had a number-average molecular weight of 19,000 in terms of polystyrene in GPC. According to the measurement result of $^1$H-NMR spectrum, about 6 weight percent of a polymer of ethylene oxide was contained. Although the reason that the polymer of ethylene oxide was contained in an amount of about 6 weight percent is not known, it is believed that the polymer is derived from the initiator or an impurity in the propylene oxide monomer.

Example 1

In a glass separable flask having an internal volume of 2 L and disposed in an oil bath that can be heated, 0.39 kg of the crude polyether A and 0.156 kg of ion-exchange water were fed. The mixture was agitated at 20° C. with an impeller to start extraction. Agitation was performed at 600 rpm using a pitched paddle impeller with an impeller diameter of 0.05 m as the impeller. Agitation was continued at 20° C. for 60 minutes, and the temperature was then continuously increased. At each temperature of 50° C., 60° C., 70° C., and 90° C., the interface between the polyether phase and the water phase was observed immediately after stopping the agitation. As a result, the interface was clearly observed, and the amount of separated water phase increased with increasing temperature. The amounts of water phase after separation were, in the increasing order of temperature, 0.095, 0.121, 0.127, and 0.127 kg, which were substantially the same as the amount of added ion-exchange water and a satisfactory amount of separation. This result shows that an efficient oil-water separation can be performed at these temperatures. The difference between 0.156 kg, which is the amount of added ion-exchange water, and the amount of separation corresponds to the amount of water dissolved and dispersed in the polyether phase and the amount of water adhered to the wall surfaces of the apparatus.

Example 2

In Example 1, the temperature during extraction was maintained at 90° C. from the initial stage, that is, the polyether at 90° C. and ion-exchange water at 90° C. were mixed. After 10 minutes from the start of the agitation, a satisfactory interface was observed when the agitation was stopped. The amount of separated water was 0.127 kg, which was the same as the amount at a separation temperature of 90° C. in Example 1.

Comparative Example 1

After the procedure of Example 2, the mixture of the polyether phase and the water phase having a satisfactory oil-water interface was transferred to a glass separatory funnel. Consequently, the temperature of the liquid was decreased to about 40° C., and the liquid wholly was whitely turbid. The oil-water interface was hardly visible.

Comparative Example 2

In Example 1, at a temperature in the range of 20° C. at the initial stage of agitation to 40° C. during temperature rising, it was more difficult to clearly observe the interface between the separated polyether phase and the water phase at a lower temperature. No interface was observed at 20° C. and 30° C. The interface was somewhat observed at 40° C., and the amount of water phase after separation was 0.075 kg, which was very small amount of separated water phase as compared with the amount at a separation temperature of 50° C. or higher.

Comparative Example 3

Extraction and separation were performed as in Example 1 except that the amount of ion-exchange water was 0.039 kg (10 parts relative to 0.39 kg of the crude polyether), and the temperature was increased in the range of 40° C. to 90° C. As a result, no separation was observed between the oil phase and the water phase at any temperatures, and the whole liquid was whitely turbid.

Examples 3 to 13 and Comparative Examples 4 to 7

The crude polyether A and the polyether oligomer B were mixed in various ratios to prepare polyethers having different amounts of the polymer of ethylene oxide. The oil-water separability during settling after agitation was evaluated using the prepared polyethers under the conditions shown in Table 1. In Examples 3 to 13, the oil-water interface could be satisfactorily observed. In contrast, in Comparative Examples 4 to 7, the whole liquid was whitely turbid and no oil-water interface was observed. Furthermore, in Examples 3 to 13 in which the oil-water interface could be satisfactorily observed, in order to quantitatively evaluate the separability, the amount of water present in the oil phase (water content) was measured after five minutes of settling. The smaller the water content, the better the separability. The results are shown in Table 1.

The amounts of water and hexane shown in Table 1 represent the number of parts by weight relative to 100 parts by weight of polyether used. The EO content (content of ethylene oxide polymer) shown in Table 1 is represented by weigh percent on the basis of the weight of polyether.

The experiments were performed with an agitation tank having three pitched paddle impellers and an internal volume of 2 L. The agitation time was about 20 minutes, and the number of revolutions was 600 rpm (600 rpm is a quite strong agitation condition).

TABLE 1

| | EO content (%) | Amount of water (Parts) | Amount of hexane (Parts) | Temperature (° C.) | Water content (Parts) |
|---|---|---|---|---|---|
| Example 3 | 6 | 800 | 0 | 85 | 120 |
| Example 4 | 6 | 5000 | 0 | 60 | <150 |
| Example 5 | 0.6 | 800 | 0 | 85 | 8 |
| Example 6 | 0.6 | 300 | 0 | 50 | <50 |
| Example 7 | 0.2 | 300 | 0 | 50 | <50 |
| Example 8 | 0.6 | 300 | 50 | 50 | <50 |
| Example 9 | 0.2 | 300 | 50 | 50 | <50 |
| Example 10 | 0.6 | 1000 | 100 | 50 | >100 |
| Example 11 | 0.2 | 1000 | 100 | 50 | >100 |
| Example 12 | 6 | 5000 | 50 | 60 | 200 |
| Example 13 | 6 | 5000 | 1500 | 60 | 400 |
| Comparative Example 4 | 6 | 5000 | 150~250 | 40 | — |
| Comparative Example 5 | 0.6 | 300 | 200 | 40 | — |
| Comparative Example 6 | 0.6 | 300~700 | 100 | 40 | — |
| Comparative Example 7 | 0.2 | 300 | 150 | 40 | — |

The invention claimed is:

1. A method for producing a polyether comprising a step of extracting and removing a water-soluble compound from a polyether containing the water-soluble compound (hereinafter referred to as "crude polyether") with water, wherein the step includes at least an operation of separating a water phase from a polyether phase at a temperature of 50° C. or higher,
wherein, in the step of extracting and removing a water-soluble compound from a crude polyether with water, 40 to 300 parts by weight of water is added relative to 100 parts by weight of the crude polyether,
wherein the operation of separating the water phase from the polyether phase after extraction is performed without centrifugal separation by settling separation,
wherein the crude polyether is either a hydroxyl-group-containing polyether prepared by allowing an alkylene oxide to react with an initiator in the presence of a metal containing catalyst, or a modified product of the hydroxyl-group-containing polyether,
wherein the crude polyether is an unsaturated-group-containing polyether, and
wherein the unsaturated-group-containing polyether is prepared by allowing an alkylene oxide to react with an initiator in the presence of a double metal cyanide complex catalyst to prepare a hydroxyl-group-containing polyether, converting the hydroxyl-group-containing polyether to an alkali metal alkoxide, and then allowing the product to react with an unsaturatedgroup-containing halogenated hydrocarbon.

2. The method for producing a polyether according to claim 1, wherein the temperature at which the water phase is separated from the polyether phase is in the range of 60° C. to 140° C.

3. The method for producing a polyether according to claim 1, wherein, in the step of extracting and removing a water-soluble compound from a crude polyether with water, 1 to 50 parts by weight of an organic solvent is added relative to 100 parts by weight of the crude polyether.

4. The method for producing a polyether according to claim 1, wherein the step of extracting and removing a water-soluble compound from a crude polyether with water is performed a plurality of times.

5. The method for producing a polyether according to claim 1 wherein, in the step of extracting and removing a water-soluble compound from a crude polyether with water, the temperature at which a mixture of the crude polyether and water is extracted is in the range of 60° C. to 140° C.

6. The method for producing a polyether according to claim 1, wherein 90 weight percent or more of the alkylene oxide is an alkylene oxide having three or more carbon atoms.

7. The method for producing a polyether according to claim 1, wherein the alkylene oxide is propylene oxide.

8. The method for producing a polyether according to claim 1, wherein the unsaturated group is an allyl group.

9. The method for producing a polyether according to claim 1, wherein the water-soluble compound is at least one selected from the group consisting of zinc salts, cobalt salts, and alkali metal salts.

10. The method for producing a polyether according to claim 1, wherein the number-average molecular weight of the polyether is in the range of 1,000 to 100,000.

* * * * *